United States Patent [19]
Kogane et al.

[11] Patent Number: 5,520,528
[45] Date of Patent: May 28, 1996

[54] MOLDING MACHINE HAVING HAND OPERATED CONTROL

[75] Inventors: Tokiro Kogane; Nobukuni Takarae, both of Hanishina-gun, Japan

[73] Assignee: Nissei Plastic Industrial Co., Ltd., Nagano, Japan

[21] Appl. No.: 312,655

[22] Filed: Sep. 27, 1994

[30] Foreign Application Priority Data

Oct. 19, 1993 [JP] Japan .................................. 5-261249

[51] Int. Cl.$^6$ ................................................ B29C 45/77
[52] U.S. Cl. .................... 425/145; 264/40.5; 264/40.6; 425/150
[58] Field of Search .................... 425/145, 150; 264/40.5, 40.6

[56] References Cited

PUBLICATIONS

Maco 8000 VA. Plastics Manufacturing Control System, May 1991, pp. 1–11.

*Primary Examiner*—Tim Heitbrink
*Attorney, Agent, or Firm*—Oliff & Berridge

[57] ABSTRACT

A molding machine having hand operated controls which are used for manually operating a plurality of movable members provided in the molding machine, is disclosed. The hand operated controls comprise: a display for showing molding information and/or an appearance of the molding machine; a plurality of first switches, such as touch switches, provided on the display, which correspond to the plurality of movable members, and are used for selecting the corresponding one of the plurality of movable members; and a second switch, such as a pair of push button switches, for operating a driving member to drive the movable member selected using one of the first switches.

21 Claims, 4 Drawing Sheets

1

MOLDING MACHINE HAVING HAND OPERATED CONTROL

BACKGROUND OF THE INVENTION

1. Field of the Invention

The present invention relates to a molding machine, e.g., an injection molding machine. In particular, it relates to a molding machine having a hand operated control which is used for manually operating to move a plurality of movable members provided in the molding machine.

2. Description of Related Art

Conventionally, a molding machine, such as an injection molding machine, has various kinds of movable members and driving members for driving the movable members. In such a molding machine, each movable member is automatically or manually operated by a driving member corresponding to each movable member.

These movable members, for example, in an injection molding machine 1 as shown in FIG. 1, are a movable platen 3 having a movable mold 2, an ejector pin 4 for taking a molded product out of a cavity of the mold, an injection unit 6 having an injection cylinder 5 thereon, and a screw (not shown) provided in the injection cylinder 5. Each of these movable members is operated by the corresponding driving member which is placed in juxtaposition with each movable member.

As the driving members for driving the movable members, a clamping cylinder 7, an ejector cylinder 8, and a hydraulic cylinder (not shown) are provided for driving the movable platen 3, the ejector pin 4, and the injection unit 6, respectively. An injection cylinder 5 for injection and for reciprocating the screw, and a hydraulic motor 9 for rotating the screw are provided for driving the screw.

Each movable member is automatically or manually operated by each driving member. The former, i.e., automatic operation, is carried out on the basis of a preset program. The latter, i.e., manual operation, is carried out by operating opening and closing switches 11 to 15 which are provided on an operating panel 10 of the injection molding machine 1, correspondingly to the movable members, respectively, as shown in FIGS. 1 and 2.

In such a conventional injection molding machine 1, since a number of opening and closing switches 11 to 15 have to be provided on the operating panel 10 for hand-operating the movable members, a large-sized operating panel 10 is required. As a result, there is a problem of restriction of degree of freedom of layout for various kinds of devices to be arranged on the injection molding machine 1, for example, a thermometer, a speedometer, a display panel and the like.

SUMMARY OF THE INVENTION

The present invention was developed in view of the above-described problems. An object of the present invention is to provide a molding machine having a simple hand operated control which is used for manually operating a plurality of movable members provided in the molding machine.

In accordance with one aspect of the present invention, the molding machine comprises a hand operated control which is used for manually operating a plurality of movable members provided in the molding machine, wherein the hand operated control comprises: a display for showing molding information; a first plurality of switches provided on the display, which correspond to the plurality of movable members, respectively, for selecting the corresponding one of the plurality of movable members; and a second switch for operating a driving member to drive the movable member selected by the first switches.

Preferably, each of the first switches comprises a touch switch, e.g., of capacitance type. As a touch switch, it is possible to utilize not only the capacitance type but also a pressure sensitive type, a type using light put out of a periphery of the display for detecting an operator's finger position by reflection of the light, or a type using a pointing device such as a light pen, or the like. The second switch may comprise a push button switch, preferably, a pair of push button switches, one of which is for operating the driving member to drive the movable member selected by the first switches in a forward direction and the other of which is for operating the driving member to drive the selected movable member in a backward direction. The display may be selected from a CRT display, a liquid crystal display, a gas plasma display and the like. The molding machine of the present invention is preferably an injection molding machine.

In the molding machine having a hand operated control of the present invention, a first plurality of switches, such as touch switches, which correspond to the plurality of movable members, respectively, are shown on the display, by switching a picture on the display for showing molding information or the like. When one of these first switches shown on the display is touched, the movable member corresponding to the touched switch is selected and the driving member for driving the selected movable member is connected to the second switch, such as a push button switch, which is provided in the vicinity of the display on the body of the molding machine. Thereafter, the selected movable member can be operated by manually operating the second switch.

Therefore, according to the present invention, only one second switch such as a push button switch or only a second pair of switches are required. Each first switch provides not only an electrical connection between the second switch and the driving member for driving the selected movable member but also a display for showing molding information or the like, so that it is possible to offer simplification in a hand operated control and reduction of area for providing the hand operated control on the molding machine. Furthermore, it is possible to ensure a fast response in hand operation control because the second switch for operating a selected movable member is electrically and directly connected with the driving member for driving the selected movable member.

In accordance with another aspect of the present invention, the display can show an appearance of the molding machine, and each first switch is provided in the vicinity of the picture of the corresponding movable member in the display.

Accordingly, at the same time that operation for the picture change of the display is performed, the appearance of the molding machine is shown on the display and each of the first switches, such as touch switches, is provided in the vicinity of the position of the each corresponding movable member in the display. Therefore, correspondence between the movable members and the first switches therefor can be ascertained. The operation can be easily and surely carried out.

In accordance with another aspect of the present invention, the first switches comprises a switch for opening or closing a movable mold, a switch for projecting or pulling back an ejector pin, a switch for reciprocating a screw, and a switch for reciprocating an injection unit; preferably, further comprises a switch for rotating the screw.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
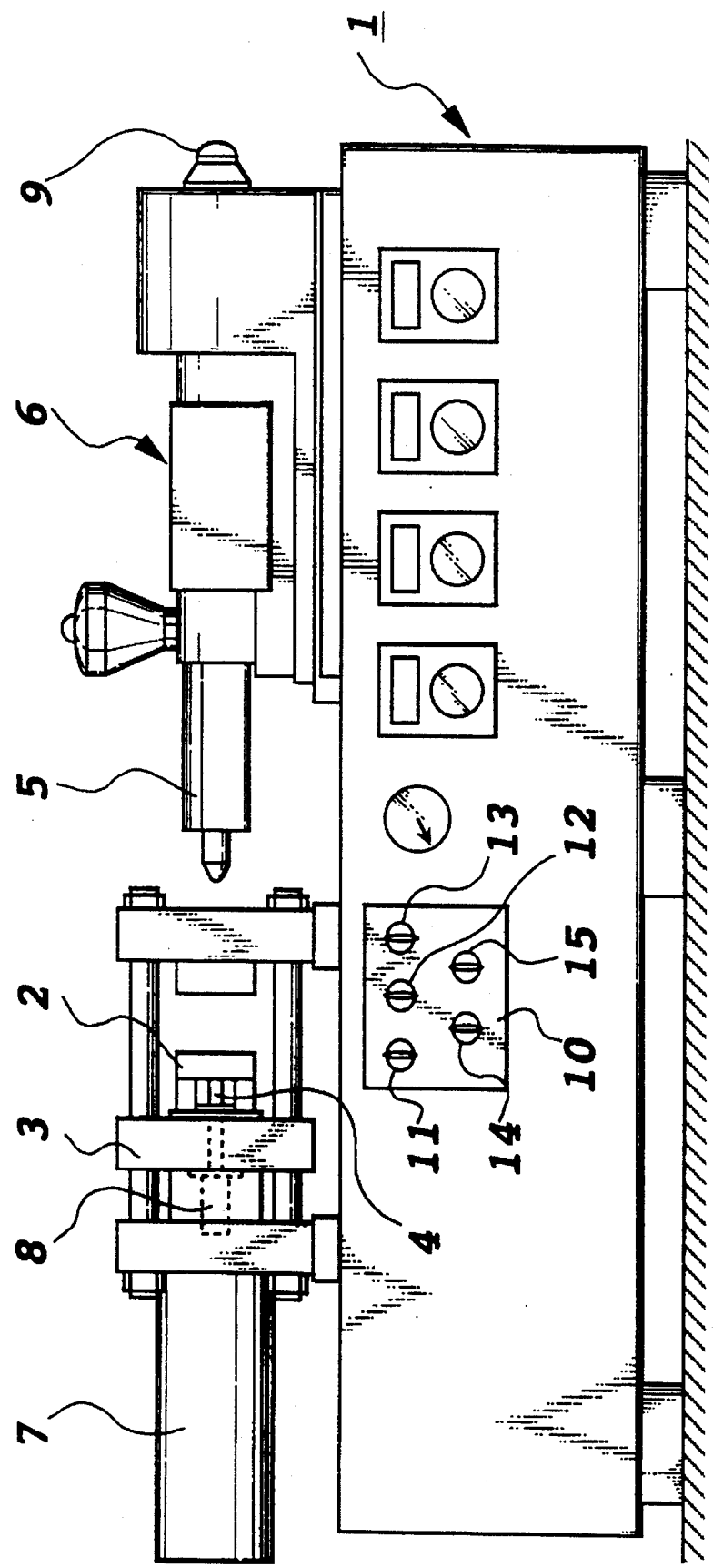
FIG. 1 is an elevational view showing a conventional molding machine.
Figure 2:
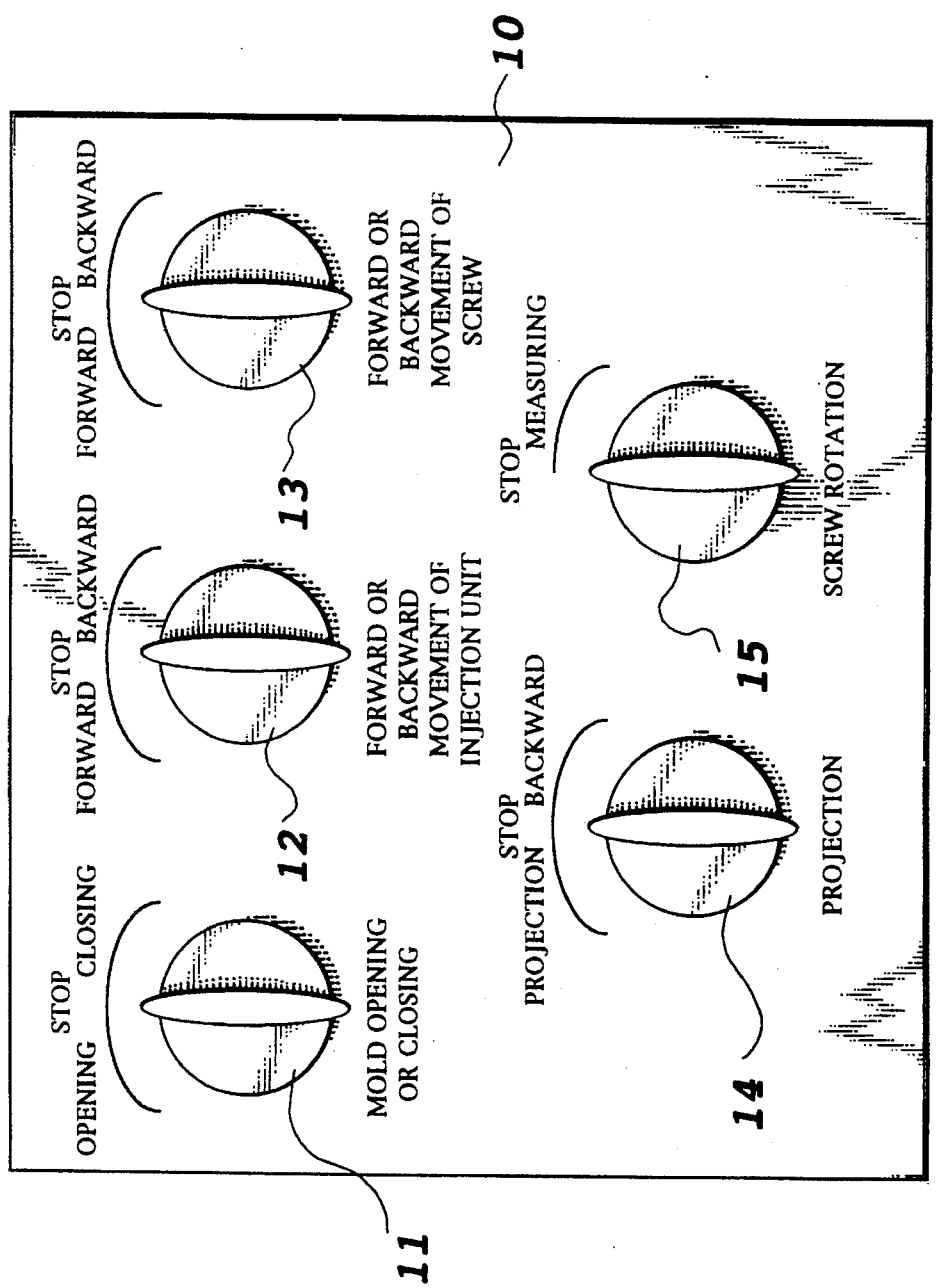
FIG. 2 is an elevational view showing an example of a hand operated control in the conventional molding machine.

Hereinafter, an embodiment of the present invention will be explained with reference to FIGS. 3 and 4. In order to simplify the explanation, the same numerals are given to the parts which have the same construction as those of the conventional molding machine shown in FIGS. 1 and 2.

Figure 3:
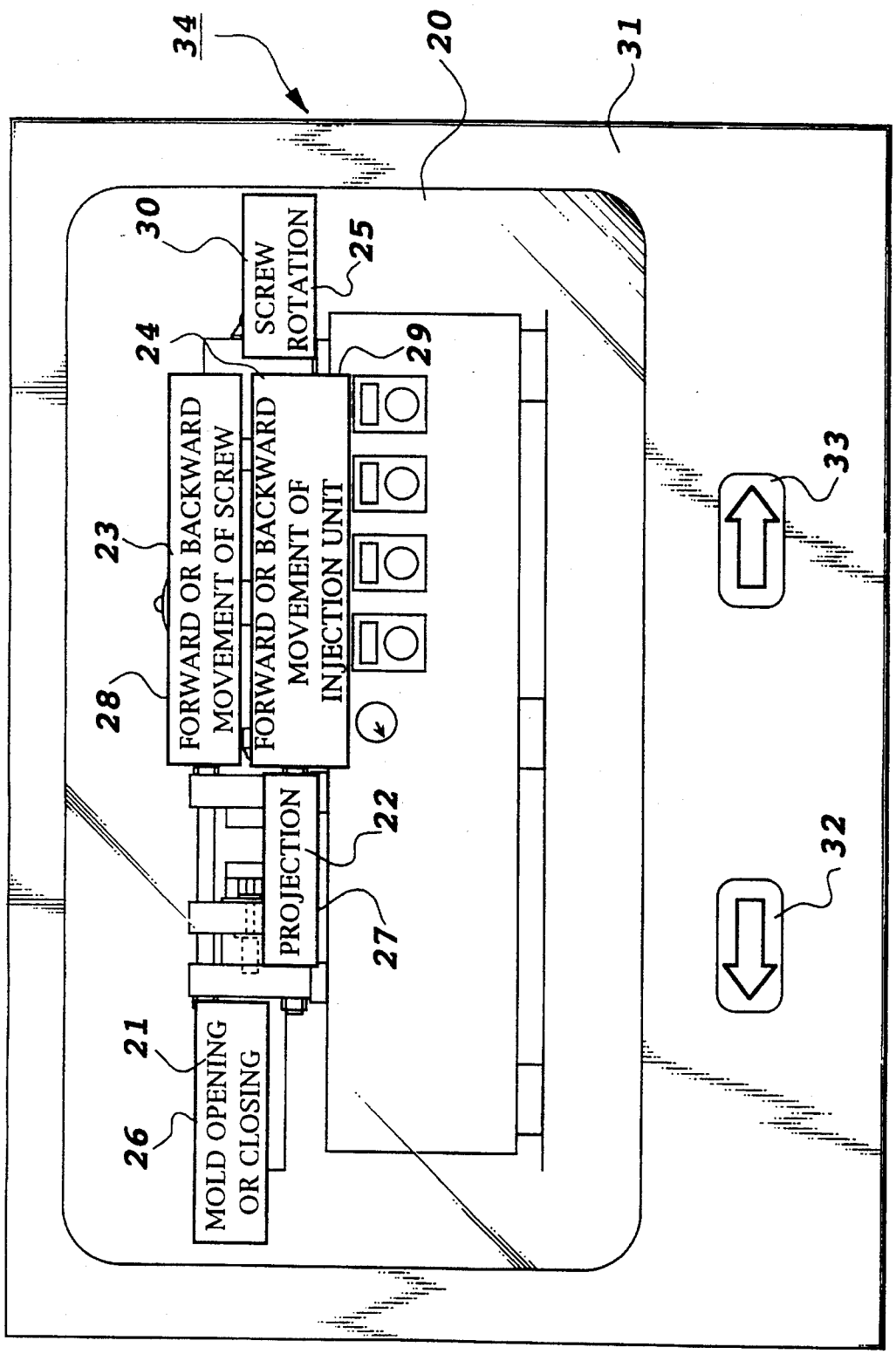
FIG. 3 is an enlarged elevational view showing an embodiment of the hand operated control in the molding machine of the present invention.

In FIG. 3, the reference numeral 20 indicates a display provided on an injection molding machine 1 according to the present invention. The display 20 is, for example, a CRT display, a liquid crystal display, a gas plasma display or the like, and displays various types of molding information such as measuring data, melting temperature, pressure for clamping, injection speed, injection pressure, holding pressure, injection time, holding time, position of the cylinder and the like by using numerical values, graphs or the like.

On the display 20, a transparent switching member (not shown) is adhered so that the entirety of the display area of the display 20 is covered thereby. A first plurality of switches 21–25 which comprise a plurality of touch switches formed by the transparent switching member, which correspond to a plurality of movable members, respectively, are arranged at the positions surrounded by corresponding thick line frames, as shown in FIG. 3.

Each the touch switches 21–25 is of a capacitance switch. When one of the touch switches 21–25 is touched by a finger of an operator, the capacitance of the touched switching member is changed so that the touched switch is turned on by detecting the change of the capacitance. These touch switches 21–25 function in a state of a specified changed picture of the display 20.

When the display 20 is changed to the aforementioned specified picture, the display 20 represents a plurality of thick line frames 26–30 which surround the corresponding touch switches 21–25 thereon, and a plurality of names of hand-operation for the movable members corresponding to the touch switches 21–25 in the thick line frames 26–30, respectively, as shown in FIG. 3.

In the embodiment, when the display is changed to the specified picture, the appearance of the injection molding machine 1 is represented in the display, and the touch switches 21–25, the thick line frames 26–30, and the names of hand-operation, i.e., "MOLD OPENING OR CLOSING", "PROJECTION", "FORWARD OR BACKWARD MOVEMENT OF SCREW", "FORWARD OR BACKWARD MOVEMENT OF INJECTION UNIT", AND "SCREW ROTATION", for the movable members corresponding to the touch switches 21–25, are represented in the vicinity of the positions of the corresponding movable members of the appearance of the injection molding machine 1 in the display, respectively.

At a lower position below the display 20 on the front surface of a body 31 in which the display 20 is provided, a second switch which comprises a pair of push button switches 32 and 33 are provided. The push button switch 32 is for operating a driving member to drive the movable member selected by the touch switches 21–25 in the injection direction of the injection molding machine 1, and the other push button switch 33 is for operating the driving member to drive the selected movable member in the opposite direction to the injection direction. In this embodiment, the display 20, the first switch comprising the touch switches 21–25, and the second switch comprising a pair of push button switches 32 and 33 constitute a hand operated control 34.

Next, an embodiment of an electric circuit including the touch switches 21–25 and a pair of push button switches 32 and 33 is explained as follows.

Figure 4:
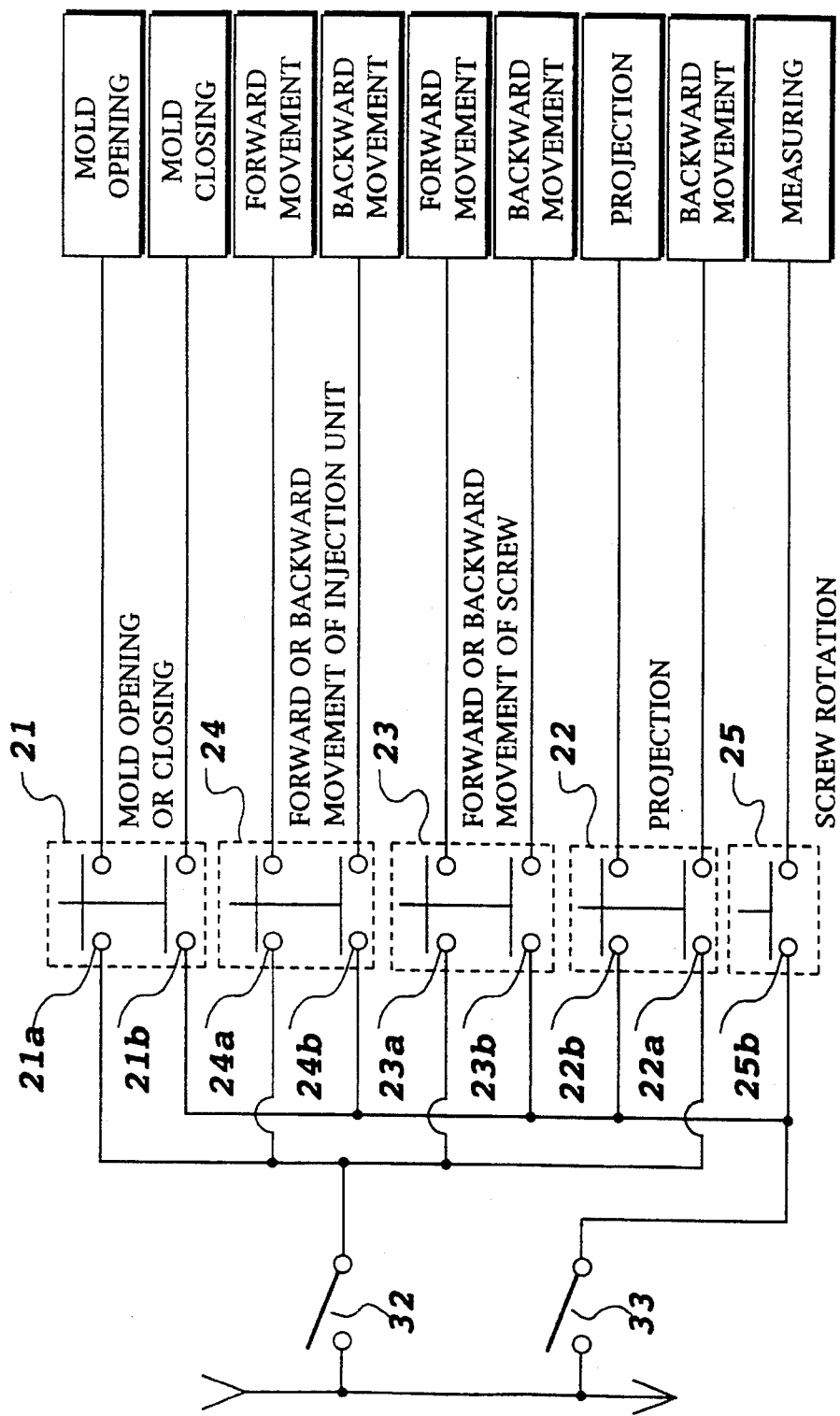
FIG. 4 is a circuit diagram for an embodiment of the hand operated control in the molding machine of the present invention.

Each of the switches 21–25, i.e., the touch switch 21 which is provided for opening or closing the movable mold 2, the touch switch 22 which is provided for projecting or pulling back the ejector pin 4, the touch switch 23 which is provided for moving the screw in a forward or backward direction, and the touch switch 24 which is provided for moving the injection unit 6 in a forward or backward direction comprises a pair of switch elements (indicated by reference numerals with suffix letters "a" or "b" in FIG. 4) which constitute two circuit systems independent of each other, for operating the driving member to drive the corresponding movable member in the forward and backward directions, respectively.

One switch element 21a, 22a, 23a or 24a of the pair of switch elements 21a and 21b, 22a and 22b, 23a and 23b, or 24a and 24b is connected with the push button switch 32, and the other switch element 21b, 22b, 23b or 24b of the pair of switch elements is connected with the push button switch 33. When one of the touch switches 21–24 is touched, both the pair of switch elements 21a and 21b, 22a and 22b, 23a and 23b, or 24a and 24b of the touched switch are turned on at the same time and held.

Therefore, for example, when touch switch, 21 of the touch switches 21–24, is selected to turn on the pair of switch elements 21a and 21b which constitute the touch switch 21, a driving member for opening the movable mold 2 is electrically connected with the push button switch 32, and a driving member for closing the movable mold 2 is electrically connected with the push button switch 33. In this selected state, when the push button switch 32 is operated, the driving member for opening the movable mold 2 is connected with a power supply and moves the movable member in the injection direction of the injection molding machine 1 to open the movable mold 2. When the push button switch 33 is operated, the driving member for closing the movable mold 2 is connected with the power supply and moves the movable mold in the backward direction to close the movable mold. Movements of other movable members in a forward or backward direction such as the ejector pin 4, the screw, and the injection unit 6 can be also carried out by touching the touch switch 22, 23, or 24, and thereafter operating one of the push button switches 32 and 33, similar to the case of the movable mold 2.

The touch switch 25 is provided for operating the driving member to rotate the screw when volume of melted plastic material is measured. The touch switch 25 comprises only a switch 25b which is connected with the push button switch 33. The reason for this is that the action for the measurement of the melted plastic material is carried out with only a rotation in one direction. The electric circuit is constructed so that even if the push button switch 32 were pushed while the touch switch 25 for measurement is selected, the screw does not operate.

The function of the present invention having such a structure will be explained as follows.

First, in order to carry out hand operated control, the picture on the display 20 is changed to a specified one of a hand operation mode which shows the appearance of the injection molding machine 1.

When an inner side of the thick line frame 26 which represents the name of hand-operation "MOLD OPENING OR CLOSING" for the movable mold 2 provided on the movable platen 3, is touched, the touch switch 21 is operated to turn on the pair of switch elements 21a and 21b. Consequently, a driving member for the clamping cylinder 7 and the like is electrically connected with the push button switches 32 and 33.

The driving member for the clamping cylinder 7 and the like is continuously operated while the push button switch 32 or 33 is pushed in this state. Closing and opening of the movable mold 2 are carried out by pushing the push button switches 33 and 32, respectively. Thereby, the movable mold 2 can be manually moved together with the movable platen 3 in a desired direction.

In order to manually operate desired one of other movable members, it is required to touch the desired one of the touch switches 22-25 to select the corresponding movable member in no pushing state of the push button switches 32 and 33, and thereafter to push a desired one of the push button switches 32 and 33.

As described above, in the present embodiment, when the picture on the display 20 which shows various kinds of molding information and is provided on the injection molding machine 1 is changed to the hand operation mode, the touch switches 21-25 corresponding to the movable members are presented on the display 20. The desired movable member is changed to a state in which an operator can manually operate the movable member by touching one of the touch switches 21-25 corresponding to the desired movable member. Then, the desired movable member can be operated by pushing the push button switches 32 and 33 alternatively.

Therefore, according to the embodiment, it is possible to select a desired movable member to be hand operated on the display which shows various kinds of molding information, and to obtain a hand operated control 34 having a simple construction because only a pair of push button switches 32 and 33 are required as the switches necessary for actual operation. As a result, it is possible to improve the degree of freedom of the layout for various types of facilities of the control system arranged on the injection molding machine 1.

Since the pair of push button switches 32 and 33 for hand operation are provided independent of the touch switches 21-25 and are directly and electrically connected with the driving members for the movable members, it is possible directly to operate the driving members by the push button switches 32 and 33, and to ensure fast response of the movable members to the hand operation.

In this embodiment, since each of the touch switches 21-25 is provided at a corresponding position on the appearance of the injection molding machine 1 which is shown on the display 20, selection of the switches for the movable members can be carried out by a picture, so that operation for selection can be easily and surely conducted.

The shape, size or the like of each structural member shown in the above-described embodiment is merely an example, and may be changed depending on the design requirements therefor. For example, when one of the touch switches 21-25 is selected, the color or tone of the inside of the frame 26-30 which surrounds the selected touch switches 21-25 may be changed, so that it is possible to show the switch being in the selected state more clearly. Further, the hand operated control may have the so-called fail-safe function, for example, when one of the push button switches 32 or 33 is operated, the other push button switch 33 or 32 may be compulsorily turned off; or when both the push button switches 32 and 33 are operated at the same time, operation of the movable member may be compulsorily stopped. Such a fail-safe function can be realized by either of an electrical treatment and a mechanical treatment.

In the embodiment, a capacitance touch switch is described as the first switch. However, as a touch switch, it is possible to use not only a capacitance touch switch but also a pressure sensitive type, a type of switch using light put out from a periphery of the display for detecting an operator's finger position by reflection of the light, a type of switch using a pointing device such as a light pen, or the like. The second switch may not only be a push button switch but may be a type of touch switch or the like.

As described above, according to the molding machine of the present invention, it is possible to select a desired movable member to be hand operated using a the display which shows various kinds of molding information, and to obtain a hand operated control having a simple construction because only a second switch, e.g., one or a pair of push bottom switches are required as switches necessary for an actual operation, after selecting a desired first switch. As a result, it is possible to improve the degree of freedom of the layout for various types of facilities of the control system arranged on the molding machine.

Since the second switches for hand operation are provided independent of the first switches and are directly and electrically connected with the driving members for the movable members, it is possible directly to operate the driving members by the second switches and to ensure fast response of the movable members to the hand operation.

What is claimed is:

1. A molding machine having hand operated controls which are used for manually operating each of a plurality of movable members provided on the body of the molding machine, wherein said hand operated controls comprise:

a display for showing molding information and an appearance of the molding machine;

a plurality of first switches provided on the display when the appearance of the molding machine is displayed, each first switch corresponding to one movable member of said plurality of movable members, respectively, for selecting the corresponding one of said plurality of movable members, each said first switch of said plurality of first switches being provided in the vicinity of a portrayal of the corresponding movable member in said display; and a second switch for operating a driving member to drive the movable member selected by said first switch.

2. The molding machine having hand operated controls as claimed in claim 1, wherein each said first switch of said plurality of first switches comprises a touch switch.

3. The molding machine having hand operated controls as claimed in claim 2, wherein each touch switch can be turned on by detecting a change in capacitance in the touch switch when touched.

4. The molding machine having hand operated controls as claimed in claim 1, wherein said second switch comprises a push button switch.

5. The molding machine having hand operated controls as claimed in claim 1, wherein said display comprises one selected from a group consisting of a CRT display, a liquid crystal display, and a gas plasma display.

6. The molding machine having hand operated controls as claimed in claim 1, wherein said molding machine is an injection molding machine.

7. The molding machine having hand operated controls as claimed in claim 1, wherein said plurality of first switches comprises a first switch for opening or closing a movable mold, a first switch for reciprocating an ejector pin, a first switch for reciprocating a screw, and a first switch for reciprocating an injection unit.

8. The molding machine having hand operated controls as claimed in claim 7, wherein said plurality of first switches further comprises a first switch for rotating said screw.

9. The molding machine having hand operated controls as claimed in claim 1, wherein when one first switch of said plurality of first switches is selected, an appearance of the selected first switch on said display is changed.

10. The molding machine having hand operated controls as claimed in claim 1, wherein said hand operated controls have a fail-safe function.

11. A molding machine having hand operated controls which are used for manually operating each of a plurality of movable members provided on the body of the molding machine, wherein said hand operated controls comprise:

a display for showing an appearance of the molding machine;

a plurality of first switches provided on said display when the appearance of the molding machine is displayed, each first switch of said plurality of first switches corresponding to one movable member of said plurality of movable members, respectively, for selecting the corresponding movable member of said plurality of movable members, each said first switch of said plurality of first switches being provided in the vicinity of a portrayal of the corresponding movable member in said display; and a second switch for operating a driving member to drive the movable member selected by said first switch, wherein said second switch comprises a pair of push button switches, one of which is for operating the driving member to drive the movable member selected by said first switch in a forward direction and the other of which is for operating the driving member to drive the selected movable member in a backward direction.

12. The molding machine having hand operated controls as claimed in claim 11, wherein when one first switch of said plurality of first switches is selected to turn on a driving member to drive the selected movable member, drive in a forward direction is electrically connected with said one push button switch and drive in a backward direction is electrically connected with said other push button switch.

13. The molding machine having hand operated controls as claimed in claim 11, wherein each said first switch of said plurality of first switches comprises a touch switch.

14. The molding machine having hand operated controls as claimed in claim 13, wherein each of said touch switches can be turned on by detecting a change in capacitance in the touch switch when touched.

15. The molding machine having hand operated controls as claimed in claim 11, wherein said second switch comprises a push button switch.

16. The molding machine having hand operated controls as claimed in claim 11, wherein said display comprises one selected from a group consisting of a CRT display, a liquid crystal display, and a gas plasma display.

17. The molding machine having hand operated controls as claimed in claim 11, wherein said molding machine is an injection molding machine.

18. The molding machine having hand operated controls as claimed in claim 11, wherein said plurality of first switches comprises a first switch for opening or closing a movable mold, a first switch for reciprocating an ejector pin, a first switch for reciprocating a screw, and a first switch for reciprocating an injection unit.

19. The molding machine having hand operated controls as claimed in claim 18, wherein said plurality of first switches further comprises a first switch for rotating said screw.

20. The molding machine having hand operated controls as claimed in claim 11, wherein when one of said plurality of first switches is selected, an appearance of the selected first switch on said display is changed.

21. The molding machine having hand operated controls as claimed in claim 11, wherein said hand operated controls have a fail-safe function.

* * * * *